United States Patent [19]
Ohta

[11] Patent Number: 6,124,944
[45] Date of Patent: *Sep. 26, 2000

[54] IMAGE PROCESSING APPARATUS AND METHOD

[75] Inventor: Takatoshi Ohta, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/870,728

[22] Filed: Jun. 6, 1997

[30] Foreign Application Priority Data

Jun. 7, 1996 [JP] Japan .................................. 8-145984

[51] Int. Cl.$^7$ ...................................................... G06F 15/00
[52] U.S. Cl. ............................................. 358/1.9; 358/518
[58] Field of Search .................................... 395/109, 101; 358/518, 523, 524, 525, 515, 500, 1.9, 1.1; 345/150, 153, 154, 155, 431; 382/167, 162, 163, 300

[56] References Cited

U.S. PATENT DOCUMENTS

| | | | |
|---|---|---|---|
| 5,319,473 | 6/1994 | Harrington | 358/501 |
| 5,448,379 | 9/1995 | Ishihara et al. | 358/518 |

FOREIGN PATENT DOCUMENTS

| | | |
|---|---|---|
| 0574905 | 12/1993 | European Pat. Off. . |
| 0665682 | 8/1995 | European Pat. Off. . |
| 0679020 | 10/1995 | European Pat. Off. . |
| 0706285 | 4/1996 | European Pat. Off. . |

*Primary Examiner*—Dov Popovici
*Attorney, Agent, or Firm*—Fitzpatrick, Cella, Harper & Scinto

[57] ABSTRACT

In a situation where information indicating whether or not a color is capable of being reproduced by an output device which is to output the entered image data is held by a three-dimensional LUT, information indicative of a color incapable of being reproduced is held on at least the boundary surfaces of the LUT. By referring to the LUT, it is judged whether or not a color expressed by the entered image data is capable of being reproduced by the output device.

11 Claims, 8 Drawing Sheets

○ NON-REPRODUCIBLE COLOR
● REPRODUCIBLE COLOR

○ NON-REPRODUCIBLE COLOR
● REPRODUCIBLE COLOR

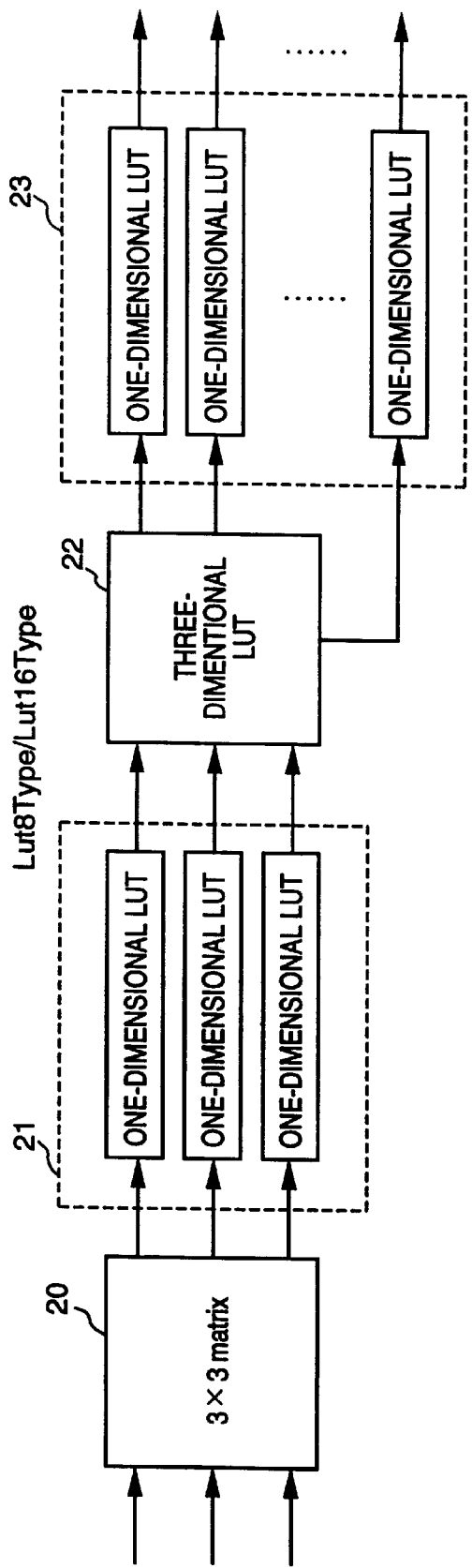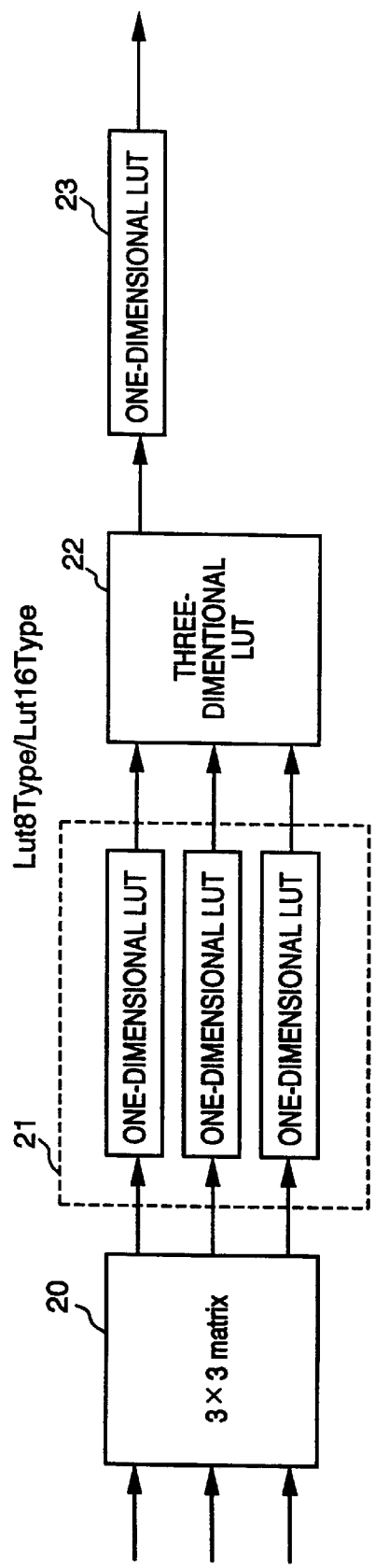

F I G. 9
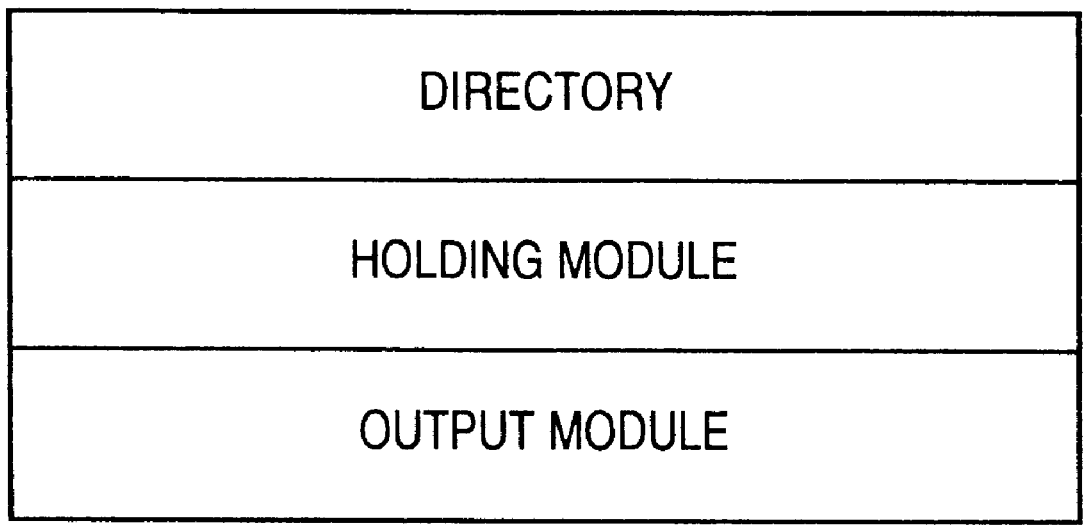

IMAGE PROCESSING APPARATUS AND METHOD

BACKGROUND OF THE INVENTION

This invention relates to an image processing apparatus and method for processing entered image data.

In order to achieve color matching between image data entered by an input device such as a monitor or scanner and image data output by an output device such as a color ink-jet printer based upon the image data, data (referred to as profile data below) describing input/output characteristics of various input/output devices is provided in the form of a database. A known image processing system for image processing such as color matching utilizes input/output profile data corresponding to these input/output devices to execute image processing between the entered image data and the output image data.

ICC (International Color Consortium) profile data, which is an example of profile data used in such image processing systems, is well known as an industrial standard.

One item of each profile data, color space, referred to as profile connection space (PCS), which is not dependent upon the input/output device, is defined by CIE XYZ color space or CIE LAB color space. Specifically, in a case where color matching between input and output devices is carried out, two-step processing is executed, namely making a transformation from color space dependent upon the input device to the profile connection space, and then making a transformation from the profile connection space to a color space dependent upon the output device. As a result of this processing, it is possible to achieve color matching between various input and output devices. One profile connection space is defined in one item of each profile data.

One item of each profile data possesses data, which is constituted by a 3-input, N-output look-up table, as a database for performing the transformation from the profile connection space to the color space dependent upon the input/output device or the transformation from the color space dependent upon the input/output device to the profile connection space. Reference is made to these data in actual image processing such as color matching. The data referred to or, in some cases, interpolated data obtained by subjecting this data to interpolation processing, is delivered as an output.

Further, one item of each profile data possesses data, which is constituted by a 3-input, 1-output look-up table, as a database for indicating whether a color specified by the profile connection space is capable of being reproduced by the input/output device. Reference is made to these data in color-reproduction range examination processing, which is for determining whether a specific color is capable of being reproduced by a certain input/output device. The data referred to or, in some cases, interpolated data obtained by subjecting this data to interpolation processing, is delivered as an output.

The structure of the data referred to at the time of image processing such as color matching is referred to as being of Lut-8 Type or of Lut-16 Type in ICC profile data. As shown in FIG. 8A, the data is constituted by a 3×3 matrix 20, a group 21 of three one-dimensional look-up tables (one-dimensional LUTs), a three-dimensional look-up table (three-dimensional LUT) 22 having d0×d0×d0-number of lattice points each of which has N elements, and a group 23 of N-number of one-dimensional look-up tables (one-dimensional LUTs). Here N represents the number of elements constituting the color space of the output device. For example, N is 3 in case of RGB space and is 4 in case of CMYK space. Further, d0 represents the number of lattice points along each spatial axis of the three-dimensional LUT.

Further, the structure of the data referred to in the processing for examining the color-reproduction range is similarly referred to as being of Lut-8 Type or of Lut-16 Type in ICC profile data. As shown in FIG. 8B, the data is constituted by a 3×3 matrix 20, a group 21 of three one-dimensional LUTs, a three-dimensional LUT 22 having d1×d1×d1-number of lattice points each of which has one element, and one one-dimensional LUT 23. Here d1 represents the number of lattice points along each spatial axis of the three-dimensional LUT. In case of ICC profile data, the data is so defined that output data of zero indicates that the specified color lies within the color-reproduction range of the output device and that output data other than zero indicates that the specified color is outside the color-reproduction range.

The difference between the Lut-8 Type and Lut-16 Type basically is that the data size stored in the look-up table is eight bits in the former and 16 bits in the latter.

Consider representing the CIE LAB space and the CIE XYZ space by integers. For example, in case of ICC profile data, each space is represented as follows using 16-bit integers:

| Color Space | Element | Range | Encoded Value |
| --- | --- | --- | --- |
| CIE XYZ | X | 0 → 1.9997 | 0000h → FFFFh |
| CIE XYZ | Y | 0 → 1.9997 | 0000h → FFFFh |
| CIE XYZ | Z | 0 → 1.9997 | 0000h → FFFFh |
| CIE LAB | L* | 0 → 100.0 | 0000h → FFFFh |
| CIE LAB | a* | −128.0 → 127.996 | 0000h → FFFFh |
| CIE LAB | b* | −128.0 → 127.996 | 0000h → FFFFh |

In a case where color spaces are thus decided, the look-up table utilized in image processing such as color matching must possess look-up table data as data corresponding to the values possible in profile connection space, namely the ranges of all color spaces decided as illustrated above. However, if all of the color spaces decided as set forth above are actually compared for both the input and output devices, it will be found that the color-reproduction ranges are small color spaces and that providing a look-up table with look-up table data in correspondence with each range of all color spaces is wasteful.

Accordingly, in a case where CIE XYZ color space is employed as the profile connection space, the method generally employed involves using a 3×3 matrix, which constitutes the elements of the look-up table, and transforming the inputs thereof to a "specific RGB space". If each element in this "specific RGB space" is expressed by 16 bits, we obtain the following:

| Color Space | Element | Range | Encoded Value |
| --- | --- | --- | --- |
| RGB | R | 0 → 1.00 | 0000h → FFFFh |
| RGB | G | 0 → 1.00 | 0000h → FFFFh |
| RGB | B | 0 → 1.00 | 0000h → FFFFh |

If a transformation is made in this fashion, the look-up table need only possess look-up table data in correspondence with the values possible as RGB values, namely the ranges of all color spaces decided as illustrated above. If the "specific RGB space" is decided as RGB space which includes color-reproduction ranges of the input/output devices, the look-up table can be constructed without waste.

However, in a case where the look-up table is constructed by employing the CIE XYZ color space as the profile connection space and making the transformation to the "specific RGB space" by the 3×3 matrix to limit the range to the color-reproduction range of the input/output device for the purpose of implementing the image processing system described above, the look-up table will not possess look-up table data with regard to colors that cannot be reproduced by the input/output device. Accordingly, in a situation where color-matching or color-reproduction range examination processing is executed upon specifying a color outside of the color-reproduction range of an input/output device having profile data composed of such look-up table data, the value of each element of the specified color is transformed to RGB space by the 3×3 matrix, after which a range of values of 0 or less are clipped at 0 and a range of values of 1.00 or greater at clipped at 1.00. Reference is had to the three-dimensional look-up table using these values and the data referred to is delivered as an output.

If data, i.e. zero, indicative of a point inside the color-reproduction range resides among the lattice points situated on the six surfaces of the three-dimensional look-up table used in color-reproduction range examination processing at this time, the value of this point is treated, in accordance with the definition described above, as data of a point relating to a color outside of the color-reproduction range. In other words, regardless of the fact that the color is one outside the range of color reproduction, the color is judged as being one inside the range of color reproduction.

SUMMARY OF THE INVENTION

Accordingly, an object of the present invention is to provide an image processing apparatus and method in which, when a judgment is made as to whether entered image data is capable of being reproduced by an output device that is to output the image data, it is possible to judge positively that reproduction of image data is not possible if image data that cannot be reproduced is entered.

According to the present invention, the foregoing object is attained by providing an image processing apparatus for processing entered image data, comprising holding means for a case where information indicating whether or not a color is capable of being reproduced by an output device, which is the output destination of the entered image data, is held in a prescribed space, said holding means holding information indicative of a color incapable of being reproduced, this information being disposed on at least boundary surfaces of the prescribed space, and judging means for judging, by referring to the prescribed space held by the holding means, whether a color expressed by the entered image data is capable of being reproduced by the output device.

Further, according to the present invention, the foregoing object is attained by providing a holding step for a case where information indicating whether or not a color is capable of being reproduced by an output device, which is the output destination of the entered image data, is held in a prescribed space, the holding step holding information indicative of a color incapable of being reproduced, this information being disposed on at least boundary surfaces of the prescribed space, and an output step of outputting the information indicating whether a color is capable of being reproduced by the output device to judging means which judges whether a color expressed by the input image data is capable of being reproduced by the output device.

In accordance with the present invention, as described above, when a judgment is made as to whether tall entered image data is capable of being reproduced by an output device that is to output the image data, it is possible to judge positively that reproduction of image data is not possible if image data that cannot be reproduced is entered.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8A is a block diagram showing the constitution of a database according to the prior art;

FIG. 8B is a block diagram showing the constitution of a database according to the prior art; and FIG. 9 is a diagram showing the structure of the memory map of a storage medium storing program codes which implement this embodiment of the present invention.

DESCRIPTION OF THE PREFERRED EMBODIMENT

A preferred embodiment of the present invention will now be described in detail with reference to the drawings.

Figure 1:
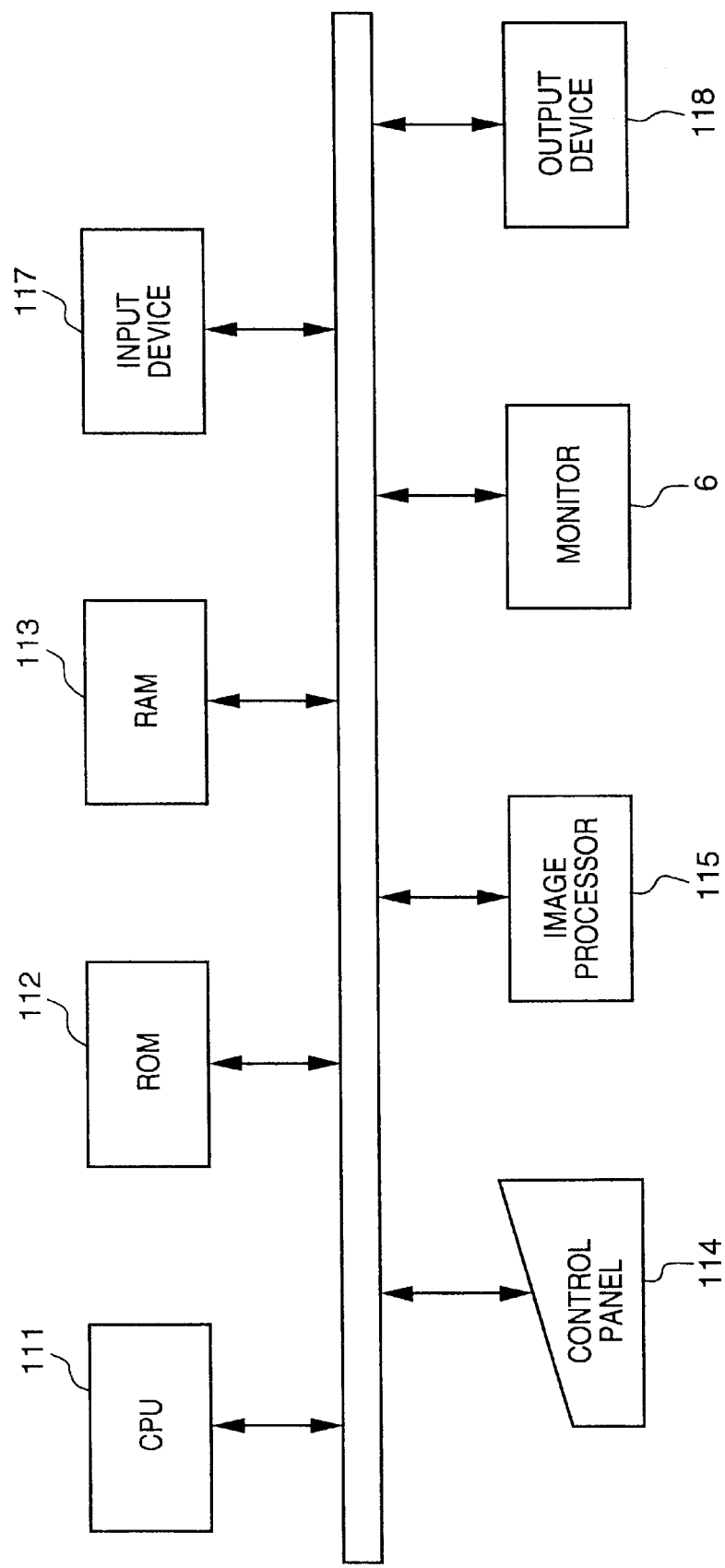
FIG. 1 is a block diagram illustrating the construction of an image processing apparatus according to an embodiment of the present invention.

FIG. 1 is a block diagram illustrating the construction of an image processing apparatus according to an embodiment of the present invention.

As shown in FIG. 1, the apparatus includes a CPU 111 for controlling a RAM 113, a control panel 114, an image processor 115, a monitor 6, an input device 117 and an output device 118. The input device 117 enters an image from an image reader such as an image scanner which includes a CCD sensor, a host computer, an external device such as an SV camera or video camera, etc., and the associated interface. The output device 118 outputs an image by an ink-jet printer, a thermal-transfer printer or a dot printer, etc. The RAM 113 provides a working area and a temporary saving area for various control programs and for data enters from the control panel 114. The latter is for entering data. The image processor 115 executes image processing (described below) that is in accordance with this embodiment. The monitor 6 displays the results of processing executed by the image processor 115 as well as data entered by the control panel 114.

The details of construction of the image processor 115 according to this embodiment will be described with reference to FIG. 2.

Figure 2:
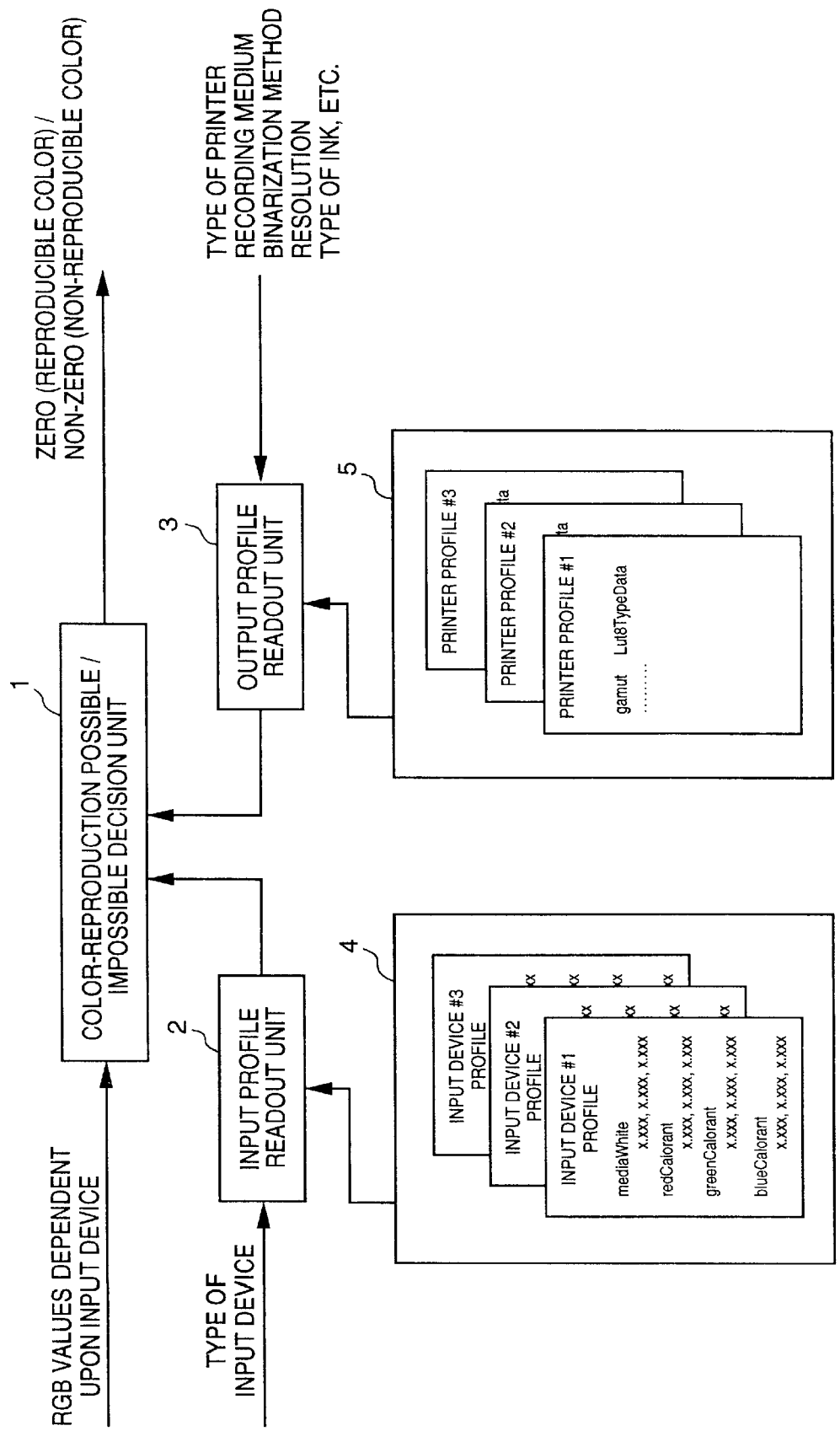
FIG. 2 is a block diagram illustrating the detailed construction of an image processor according to this embodiment of the present invention.

FIG. 2 is a block diagram illustrating the detailed construction of the image processor 115 according to this embodiment of the present invention.

As shown in FIG. 2, the image processor includes a color-reproduction possible/impossible decision unit 1 which executes processing for examining range of color reproduction. The decision unit 1 determines whether entered image data possessing RGB values dependent upon the input device 117 is capable of being reproduced by the output device 118.

A signal representing the type of the input device 117, namely a signal which indicates which of plural types of input devices connected to the system has supplied the input, enters an input-profile readout unit 2. Upon receiving this signal, the readout unit 2 reads input profile data, in which the input characteristics of the input device 117 corresponding to the type thereof are described, out of an input profile storage unit 4.

A signal representing the type of the output device 118, namely a signal which indicates which of plural types of output devices connected to the system provides the output, enters an output-profile readout unit 3. Also applied to the output-profile readout unit 3 as inputs are the type of recording media set in the output device 118 of the particular type, the binarizing method and resolution that have been set, and the type of ink used when the output is produced. When these signals enter the output-profile readout unit 3, the latter reads output profile data, in which characteristics corresponding to the particular output device 118 and to the various settings are described, out of an output profile storage unit 5.

The input profile storage unit 4 stores input profile data describing the input characteristics of various input devices 117 capable of being connected to the system. Input profile data corresponding to the input device 117 connected to the system are read out of the input profile storage unit 4 by the input-profile readout unit 2.

The output profile storage unit 5 stores output profile data describing the output characteristics conforming to various settings of various output devices capable of being connected to the system. Output profile data corresponding to the output device 118 connected to the system and to the various settings is read out of the output profile storage unit 5 by the output-profile readout unit 3.

It will be assumed here that the structure of the profile data used in this embodiment conforms to the format of the ICC profile.

The details of construction of the color-reproduction possible/impossible decision unit 1 according to this embodiment will now be described with reference to FIG. 3.

Figure 3:
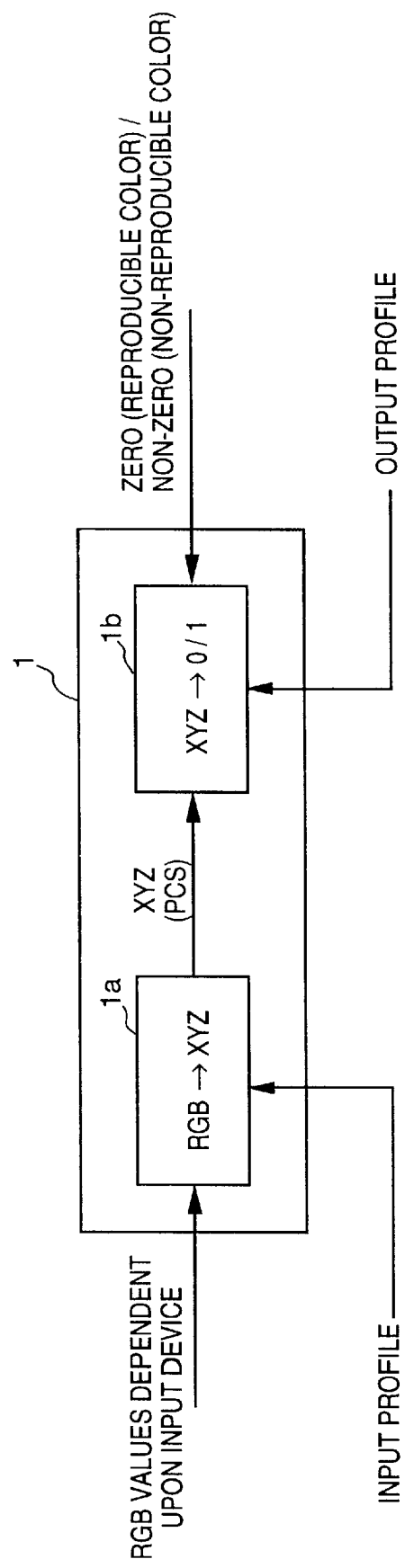
FIG. 3 is a block diagram illustrating the detailed construction of a color reproduction possible/impossible decision unit according to this embodiment.

FIG. 3 is a block diagram illustrating the detailed construction of the color reproduction possible/impossible decision unit 1 according to this embodiment.

As shown in FIG. 3, the color-reproduction possible/impossible decision unit 1 includes a first signal converter 1a for transforming image data, which has RGB values dependent upon the input device 117, to image data having XYZ values based upon the profile connection space. The transformation is made in accordance with information provided by the input profile data. The unit 1 further includes a second signal converter 1b for outputting information indicating whether the image data having the XYZ values based upon the profile connection space output by the first signal converter 1a is capable or incapable of being reproduced. This output is produced in accordance with information provided by output profile data.

The signal conversion processing performed by the first signal converter 1a is carried out based upon the following arithmetic expressions. In accordance with these expressions, the image data having RGB values dependent upon the input device 117 are transformed to the image data having the XYZ values based upon the profile connection space:

linear(r)=redTRC[device(r)]
linear(g)=greenTRC[device(g)]
linear(b)=blueTRC[device(b)]

$$connectionX = redColorantX \times linear(r) + \\ greenColorantX \times linear(g) + \\ blueColorantX \times linear(b)$$

$$connectionY = redColorantY \times linear(r) + \\ greenColorantY \times linear(g) + \\ blueColorantY \times linear(b)$$

$$connectionZ = redColorantZ \times linear(r) + \\ greenColorantZ \times linear(g) + \\ blueColorantZ \times linear(b)$$

Here device(r), device(g) and device(b) constitute the image data, which have RGB values dependent upon the input device 117, applied to the color-reproduction possible/impossible decision unit 1.

Further, redTRC[], greenTRC[] and blueTRC[] are functions (curves) describing the tonality characteristics of the input device 117. These are for correcting the non-linear tonality characteristics of the input device 117 and are described in the input profile data. Further, linear(r), linear (g) and linear(b) are corrected RGB values.

Further, redColorantX, redColorantY and redColorantZ are the XYZ chromaticity components of the R value dependent upon the input device 117, greenColorantX, greenColorantY and greenColorantZ are the XYZ chromaticity components of the G value dependent upon the input device 117, and blueColorantX, blueColorantY and blueColorantZ are the XYZ chromaticity components of the B value dependent upon the input device 117. All of these are also described in the input profile data. Further, connectionsX, connectionY and connectionZ are XYZ coordinates based upon the profile connection space of the entered color.

The details of the construction of the second signal converter 1b and the signal transformation processing executed thereby according to this embodiment will now be described with reference to FIG. 4.

Figure 4:
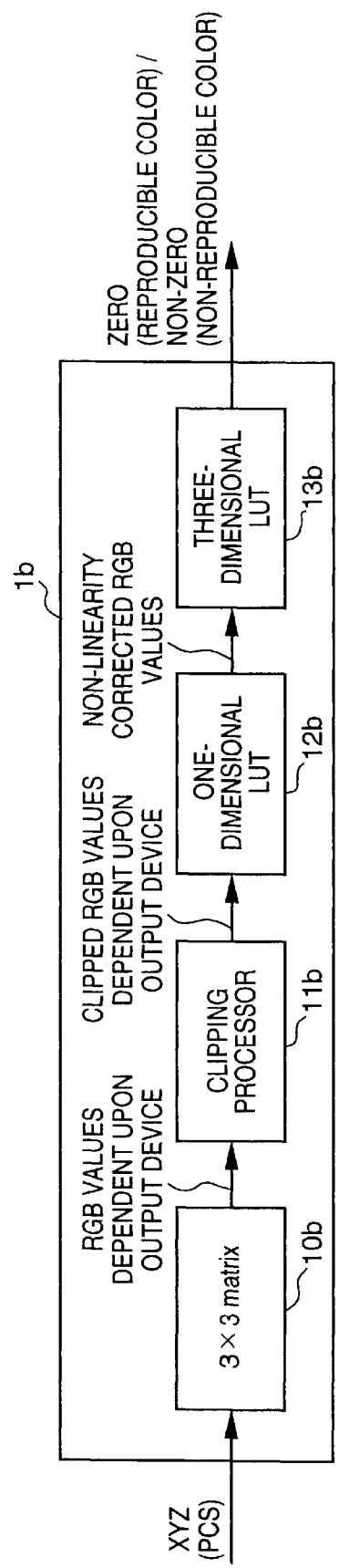
FIG. 4 is a block diagram illustrating the detailed construction of a second signal converter according to this embodiment.

FIG. 4 is a block diagram illustrating the detailed construction of the second signal converter 1b according to this embodiment.

First, the image data having the XYZ values based upon the profile connection space output by the first signal converter 1a enters a color space transformation unit 10b. The color space transformation unit 10b subjects the entered image data having the XYZ values to a color space transformation based upon the arithmetic operation of a 3×3 matrix. The image data having the XYZ values are transformed to image data having RGB values dependent upon the output device 118.

Next, the image data having the RGB values dependent upon the output device 118 and output by the color space transformation unit 10b enters a clipping processor 11b. The latter executes clipping processing for clipping the entered image data having the RGB values dependent upon the output device 118 to an appropriate range. For example, if each dynamic range of the image data having the RGB values dependent upon the output device is 0 to 1.00 and ranges outside of these limits are obtained by the color space transformation unit 10b, the RGB values are clipped at 0 for ranges of values of 0 or less and at 1.00 a ranges of values of 1.0 or greater.

Next, the image data having the clipped RGB values dependent upon the output device 118 and output by the clipping processor 11b enter a one-dimensional LUT 12b. The latter applies a non-linear correction to the image data having the clipping RGB values dependent upon the output device 118. This is to apply a correction in a case where the entered image data having the RGB values is image data representing luminance while the input to a three-dimensional LUT 13b, referred to next, is not a luminance input (e.g. is a density input).

The image data having the non-linearity corrected RGB values output by the one-dimensional LUT 12b enters the three-dimensional LUT 13b. The latter refers to its own data, or executes interpolation processing based upon reference data obtained by reference, with respect to the image data having the non-linearity corrected RGB values. The three-dimensional LUT 13b outputs "zero" or "non-zero" based upon the results of reference or the results of interpolation processing. If "zero" is output, this indicates that the image data that has entered from the input device 117 is within the color-reproduction range of the output device 118. If "non-zero" is output, this indicates that the image data that has entered from the input device 117 is outside the color-reproduction range of the output device 118.

It should be noted that all of the data necessary for the signal conversion processing executed by the second signal converter described in FIG. 4 has been stored in the output profile data.

The constitution of the three-dimensional LUT 13b described in FIG. 4 according to this embodiment will now be described with reference to FIG. 5.

Figure 5:
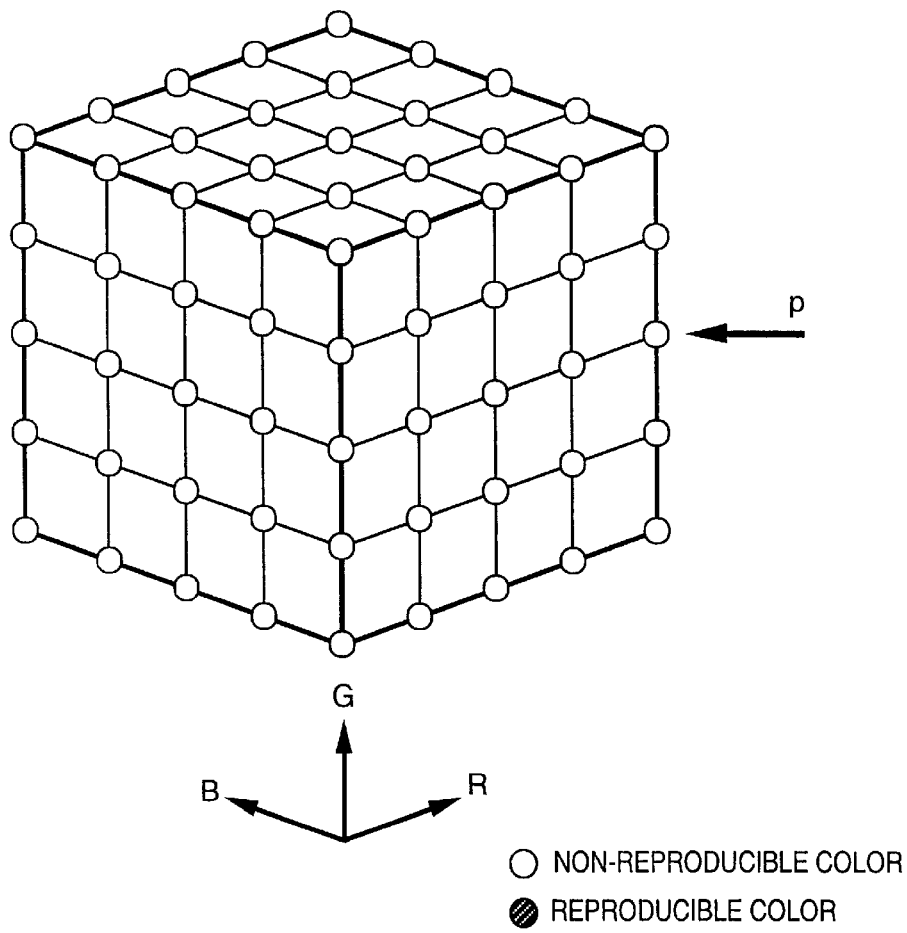
FIG. 5 is a diagram schematically showing the constitution of a three-dimensional LUT according to this embodiment.

FIG. 5 is a diagram schematically showing the constitution of the three-dimensional LUT 13b according to this embodiment.

As shown in FIG. 5, each axis of the RGB color space has five lattice points. Stored in advance at these lattice points are values indicating whether or not the corresponding colors are capable of being reproduced by the output device 118. If a value is "non-zero" (a white point), this indicates that the color cannot be reproduced. If a value is "zero" (a black point), this indicates that the color can be reproduced. In this embodiment, the LUT is so constructed that all lattice points on the six sides of the cube have "non-zero" values. In other words, FIG. 5 shows that the colors situated on the sides of the cube are all incapable of being reproduced by the output device 118.

Figure 6:
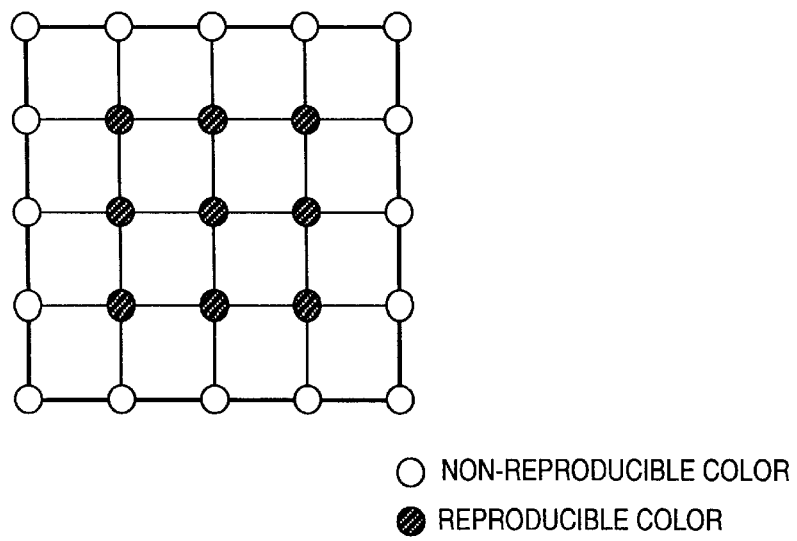
FIG. 6 is a sectional view of the three-dimensional LUT of FIG. 5.

Further, if the three-dimensional LUT 13b of FIG. 5 is cut horizontally at a position indicated by the arrow P in FIG. 5, the resulting cross section will be as shown in FIG. 6 when viewed from above. As illustrated in FIG. 6, the colors at the nine points situated inside the cross section are capable of being reproduced, while the colors at the 16 points situated on the sides are not capable of being reproduced.

Figure 7:
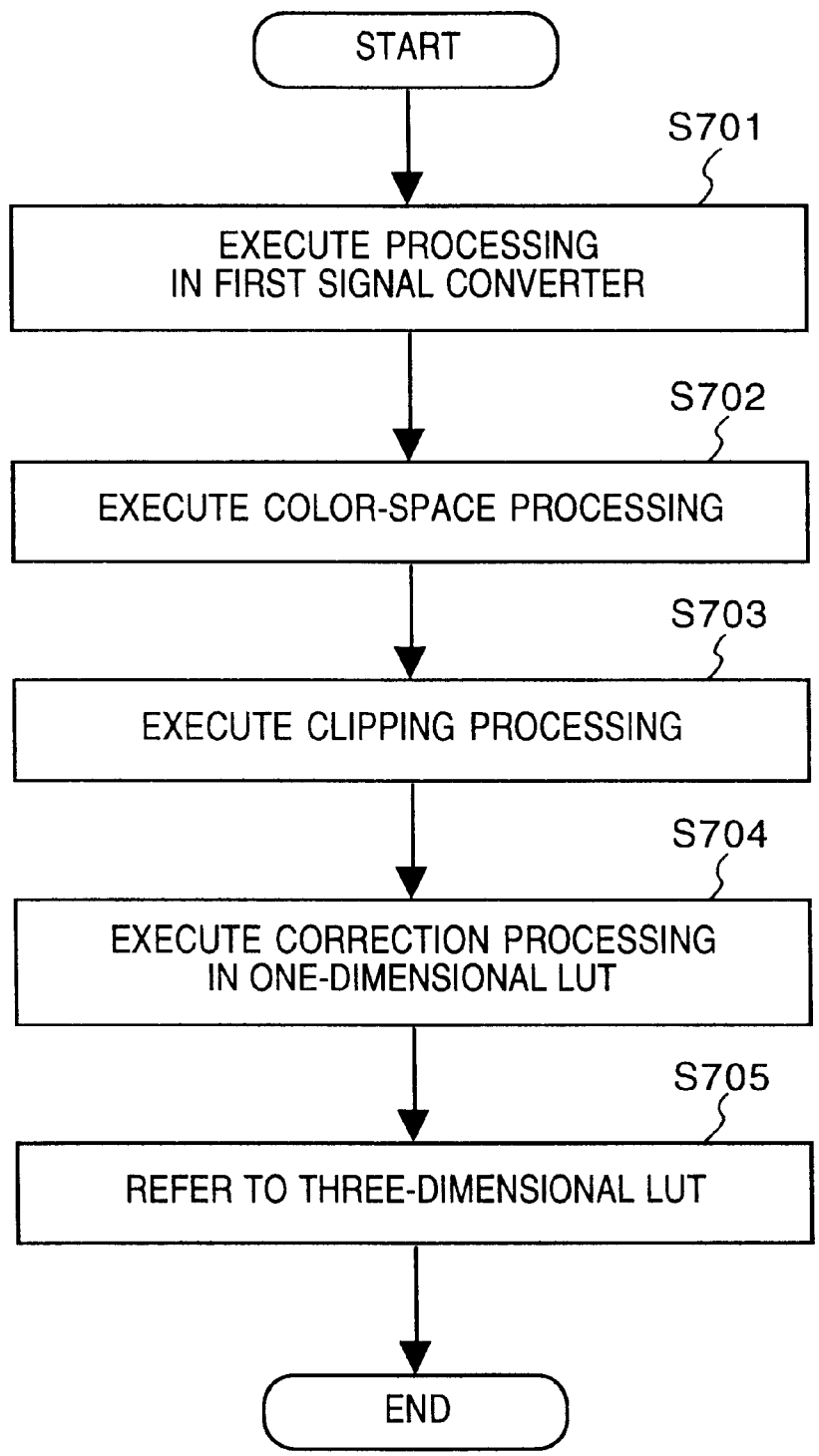
FIG. 7 is a flowchart illustrating the essentials of processing executed by the color reproduction possible/impossible decision unit according to this embodiment.

Reference will now be had to the flowchart of FIG. 7 to describe the essentials of processing in the color-reproduction possible/impossible decision unit 1 for a case where the above-mentioned three-dimensional LUT 13b is constructed and, by way of example, image data having RGB values incapable of being reproduced by the output device 18 enter from the input device 117.

FIG. 7 is a flowchart illustrating the essentials of processing executed by the color reproduction possible/impossible decision unit 1 according to this embodiment.

First, at step S701, image data that have entered from the input device 117 are transformed to image data having XYZ values based upon profile connection space by the first signal converter 1a shown in FIG. 3. Next, at step S702, this image data is transformed to image data having RGB values dependent upon the output device 118 by the color space transformation unit 10b shown in FIG. 4. Clipping processing is then applied by the clipping processor at step S703. It should be noted that in a case where image data having RGB values incapable of being reproduced by the output device 118 enter, at least one value of the RGB values takes on a value of 0 or 1.00.

This is followed by step S704, at which correction processing in the one-dimensional LUT 12b is applied to the values output by the clipping processor 11b. If compensation has been made for the fact that output values corresponding to input values of 0 and 1.00 (i.e. values obtained by the clipping of colors outside the range of color reproduction) are 0 and 1.00 in the correction processing of the one-dimensional LUT 12b, then, in a case where the three-dimensional LUT 13b is referred to using these output values (output values corresponding to colors outside the range of color reproduction), then reference will always be had to points somewhere on the six sides of the three-dimensional LUT 13b.

Next, at step S705, reference is had to the three-dimensional LUT 13b based upon the output values obtained by the correction processing of the one-dimensional LUT 12b, and "zero" or "non-zero" is output. If it is found that the output values of the one-dimensional LUT 12b are 0 and 0.00, then "non-zero" is output because reference is had to a lattice point situated somewhere on the six sides of the three-dimensional LUT 13b. On the other hand, if it is found that the output values are not 0 and 1.0, then "zero" is output because reference is made to a lattice point other than a lattice point situated on the six sides of the three-dimensional LUT 13b.

Thus, lattice points situated on the six sides of the three-dimensional LUT 13b of this embodiment are all made "non-zero" points, which indicate that reproduction is not possible by the output device 118. Therefore, regardless of the color entered by the input device 117, even if the color is one that cannot be reproduced by the output device, "non-zero" will be output and an erroneous decision to the effect that the color is capable of being reproduced will not be made.

In accordance with this embodiment, as described above, the three-dimensional LUT used by the color-reproduction possible/impossible decision unit 1 which executes processing for examining color-reproduction range is constituted by the three-dimensional LUT 13b of the kind shown in FIG. 5. As a result, when any color outside the range of color reproduction enters from the input device 117, it is possible to judge correctly that this color is outside the range of color reproduction.

(Modification)

Though the three-dimensional LUT is constructed as shown in FIGS. 5 and 6 in the foregoing embodiment, the invention is not limited to this LUT construction.

Specifically, in order to improve the accuracy of a gamut check, the three-dimensional LUT may be constructed to store "non-zero" values with respect to the lattice-point data present on the six sides of the cube and within the cube in conformity with the gamut of the output device.

Further, in the foregoing embodiment, only the processing of the gamut check is described. However, an arrangement may be adopted in which processing data, which is used in color matching processing performed when color reproduction is carried out in the output device, is stored in the profile data.

This color matching processing also is implemented using the processing shown in FIG. 8A and FIG. 8B. Accordingly, a 3×3 matrix, a one-dimensional LUT and a three-dimensional LUT, etc., are available as processing data used in color matching processing. Here a prescribed gamut is assumed as the input gamut and data for implementing processing which maps the colors in the prescribed gamut to the colors in the gamut of the output device has been stored in the three-dimensional LUT.

Further, coefficients for converting XYZ values to RGB values in dependence upon the prescribed gamut have been stored as the 3×3 matrix. Accordingly, the 3×3 matrix used in the gamut check and the 3×3 matrix used in color matching processing differ.

The purpose of the gamut check is to judge, in highly precise fashion, colors that cannot be reproduced by the output device. Accordingly, the 3×3 matrix for converting the XYZ values in such a manner that the six sides of the cube will be colors that are incapable of being reproduced is stored in the profile data.

On the other hand, the purpose of color matching processing is to match the color appearance of the output image produced by the output device with the color appearance of the input image. This means that whether colors outside of the gamut of the output device are to be mapped to colors within the gamut is an important factor. Accordingly, the 3×3 matrix for converting the XYZ values to RGB values in dependence upon the prescribed gamut hypothesized by the designer is stored in the profile data.

By thus storing a 3×3 matrix suited to each type of processing in the profile data, the accuracy of each type of processing can be improved.

Though this embodiment has been described using profile data based upon the ICC profile format, the invention is not limited to this format.

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing program codes for performing the aforesaid functions of the foregoing embodiment to a system or an apparatus, reading the program codes with a computer (e.g., a CPU or MPU) of the system or apparatus from the storage medium, and then executing the program.

In this case, the program codes read from the storage medium implement the functions according to the embodiments, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, it goes without saying that the present invention covers a case where an operating system (OS) or the like working on the computer performs a part of or the entire process in accordance with the designation of program codes and implements the functions according to the embodiment.

Furthermore, it goes without saying that the present invention further covers a case where, after the program codes read from the storage medium are written to a function extension board inserted into the computer or to a memory provided in a function extension unit connected to the computer, a CPU or the like contained in the function extension board or function extension unit performs a part of or the entire process in accordance with the designation of program codes and implements the function of the above embodiments.

In a case where the present invention is applied to the above-mentioned storage medium, program codes corresponding to the flowchart described earlier are stored on this storage medium. More specifically, modules illustrated in the example of the memory map of FIG. 9 are stored on the storage medium.

Specifically, it will suffice to store program codes of at least a "holding module" and an "output module" on the storage medium.

In a case where information indicating whether a color is capable of being reproduced by an output device which is the output destination of input image data is held in a prescribed space, the "holding module" holds information indicating a color incapable of being reproduced, this information being stored on a storage medium by being placed on at least boundary surfaces of the prescribed space. The "output module" outputs information indicating whether a color is capable of being reproduced by the output device to judging means, which judges whether a color expressed by the input image data is capable of being reproduced by the output device.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

a look-up table that stores data indicating whether or not each of a plurality of representative points lies within a color-reproduction range of an output device;

entry means for entering image data having a plurality of color components; and judging means for performing interpolation processing by referring to said look-up table in accordance with the entered image data, and judging whether or not the entered image data lies within the color-reproduction range of the output device based on output data provided by the interpolation processing, wherein said look-up table stores data representative of all points located at sides of a solid comprised by the plurality of color components and which are out of the color-reproduction range of the output device.

2. The apparatus according to claim 1, wherein the entered image data is comprised of three color components, and the solid is a cube.

3. The apparatus according to claim 1, further comprising holding means for holding characteristics of the output device, the characteristics including at least a 3×3 matrix for transforming the entered image data to a color space dependent upon the output device, and a one-dimensional look-up table for linearly correcting image data transformed by the 3×3 matrix.

4. The apparatus according to claim 3, wherein said look-up table, the 3×3 matrix, and the one-dimensional look-up table are stored in a profile according to International Color Consortium stipulations.

5. The apparatus according to claim 1, further comprising holding means for holding characteristics of an input device, which is a source of the entered image data, the characteristics including at least chromaticity coordinates and a tonality characteristic curve of a color space dependent upon the input device.

6. An image processing method comprising the steps of:

provingaa look-up table that stores data indicating whether or not each of a plurality of representative points lies within a color-reproduction range of an output device;

entering image data having a plurality of color components; and performing interpolation processing by referring to the look-up table in accordance with the entered image data, and judging whether or not the entered image data lies within the color-reproduction range of the output device based on output data provided by the interpolation processing, wherein the look-up table stores data representative of all points located at sides of a solid comprised by the plurality of color components and which are out of the color-reproduction range of the output device.

7. The method according to claim 6, wherein the entered image data is comprised of three color components, and the solid is a cube.

8. The method according to claim 6, further comprising the step of holding characteristics of the output device, the characteristics including at least a 3×3 matrix for transforming the entered image data to a color space dependent upon the output device, and a one-dimensional look-up table for linearly correcting image data transformed by the 3×3 matrix.

9. The method according to claim 6, further comprising the step of holding characteristics of an input device, which is a source of the entered image data, the characteristics including at least chromaticity coordinates and a tonality characteristic curve of a color space dependent upon the input device.

10. A computer readable memory storing program codes for performing an image processing method, the program codes comprising:

code for entering image data having a plurality of color components; and code for performing interpolation processing by referring to a look-up table that stores data indicating whether or not each of a plurality of representative points lies within a color-reproduction range of an output device in accordance with the entered image data, and judging whether or not the entered image data lies within the color-reproduction range of the output device based on output data provided by the interpolation processing, wherein the look-up table stores data representative of all points located at sides of a solid comprised by the plurality of color components and which are out of the color-reproduction range of the output device.

11. A look-up table for use with an image processor that judges whether or not entered image data lies within a color-reproduction range of an output device, comprising:

a table storing data indicating whether or not each of a plurality of representative points lies within the color-reproduction range of the output device, wherein the image processor enters image data having a plurality of color components, performs interpolation processing by referring to said look-up table in accordance with the entered image data, and judges whether or not the entered image data lies within the color-reproducing range of the output device based on output data provided by the interpolation processing, and wherein the stored data represents all points that are located at sides of a solid comprised by the plurality of color components and that are out of the color-reproducing range of the output device.

* * * * *

UNITED STATES PATENT AND TRADEMARK OFFICE
CERTIFICATE OF CORRECTION

PATENT NO. : 6,124,944

DATED : September 26, 2000

INVENTOR(S) : TAKATOSHI OHTA

It is certified that error appears in the above-identified patent and that said Letters Patent is hereby corrected as shown below:

In the Drawings:

SHEET 2

Fig. 2, "redCalorant" should read --redColorant--.
"greenCalorant" should read --greenColorant--.
"blueCalorant" should read --blueColorant--.

COLUMN 4

Line 4, "tall" should be deleted.

COLUMN 5

Line 2, "enters should read --entered--.

Signed and Sealed this

Fifteenth Day of May, 2001

Attest:

NICHOLAS P. GODICI

Attesting Officer        Acting Director of the United States Patent and Trademark Office